(12) United States Patent
Bourne et al.

(10) Patent No.: US 10,309,304 B2
(45) Date of Patent: Jun. 4, 2019

(54) ELECTRICAL AUGMENTATION OF A GAS TURBINE ENGINE

(71) Applicant: Sikorsky Aircraft Corporation, Stratford, CT (US)

(72) Inventors: Frederick L. Bourne, Litchfield, CT (US); Mark Denton Bystry, Jr., Stratford, CT (US); Joseph Lawrence Simonetti, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 256 days.

(21) Appl. No.: 15/122,825

(22) PCT Filed: Mar. 4, 2014

(86) PCT No.: PCT/US2014/020084
§ 371 (c)(1),
(2) Date: Aug. 31, 2016

(87) PCT Pub. No.: WO2015/133994
PCT Pub. Date: Sep. 11, 2015

(65) Prior Publication Data
US 2017/0089261 A1 Mar. 30, 2017

(51) Int. Cl.
*F02C 6/14* (2006.01)
*F01D 15/10* (2006.01)
(Continued)

(52) U.S. Cl.
CPC ............ *F02C 6/14* (2013.01); *F01D 15/10* (2013.01); *F01D 21/003* (2013.01); *F01D 21/14* (2013.01);
(Continued)

(58) Field of Classification Search
CPC . F02C 6/14; F01D 15/10; F02N 11/08; F05D 2270/04
See application file for complete search history.

(56) References Cited

U.S. PATENT DOCUMENTS 6,836,086 B1 * 12/2004 Goldberg .................. F02C 7/26
318/139
2002/0121091 A1 * 9/2002 Gilbreth ................... F01D 15/10
60/773

(Continued)

FOREIGN PATENT DOCUMENTS

EP 0623741 11/1994

OTHER PUBLICATIONS

IInternational Search Report and Written Opinion for Application No. PCT/U52014/020084 dated Oct. 21, 2014; 16 pgs.
(Continued)

*Primary Examiner* — Steven M Sutherland
(74) *Attorney, Agent, or Firm* — Cantor Colburn LLP (57) ABSTRACT

One aspect is an electrical augmentation system for a gas turbine engine. The electrical augmentation system includes an electric motor operably coupled to a shaft of the gas turbine engine, and an energy storage device operable to provide a temporary increased current source to the electric motor. The electrical augmentation system includes a control system having a torque demand anticipation circuit operable to determine an anticipated torque increase condition for the gas turbine engine. Based on the anticipated torque increase condition, the torque demand anticipation circuit commands a temporary torque increase by the electric motor using the energy storage device.

15 Claims, 4 Drawing Sheets

(51) Int. Cl.
  *F01D 21/00* (2006.01)
  *F01D 21/14* (2006.01)
  *F02C 3/04* (2006.01)
  *F02N 11/08* (2006.01)

(52) U.S. Cl.
  CPC ................ *F02C 3/04* (2013.01); *F02N 11/08* (2013.01); *F05D 2220/32* (2013.01); *F05D 2240/35* (2013.01); *F05D 2240/60* (2013.01); *F05D 2270/04* (2013.01)

(56) References Cited

U.S. PATENT DOCUMENTS

| | | | |
|---|---|---|---|
| 2003/0135305 A1 | 7/2003 | Zagranski et al. | |
| 2004/0041404 A1* | 3/2004 | McConnell | F01D 15/10 290/52 |
| 2006/0220387 A1 | 10/2006 | Tsuzuki | |
| 2006/0225431 A1 | 10/2006 | Kupratis | |
| 2007/0132245 A1* | 6/2007 | Duesterhoeft | F01D 15/10 290/27 |
| 2008/0276620 A1 | 11/2008 | Ullyott et al. | |
| 2010/0276942 A1 | 11/2010 | Hicks et al. | |
| 2011/0179802 A1 | 7/2011 | Snider et al. | |

OTHER PUBLICATIONS

M. Sinnett, "787 Program | Electrical System and Batteries," Feb. 2013, retrieved from the internet http://www.boeing.com/787-media-resource/docs/Sinnett-TOS-Deck.pdf on Oct. 29, 2013, 26 pages.

StartPac.com, "Tutorial 24 Volt vs. 28.5 Volt Power Supply Tutorial," retrieved from the internet http://startpac.com/tutorial/ on Oct. 29, 2013, 2 pages.

Wikipedia, "Aircraft Engine Starting," retrieved from the internet http://en.wikipedia.org/wiki/Aircraft_engine_starting on Oct. 29, 2013, 8 pages.

* cited by examiner

ELECTRICAL AUGMENTATION OF A GAS TURBINE ENGINE

STATEMENT OF FEDERAL SUPPORT

This invention was made with Government support under Contract No. FA8650-09-D-2923 awarded by the U.S. Air Force. The Government has certain rights in the invention.

CROSS REFERENCE TO RELATED APPLICATIONS

This application is a National Phase Application of Patent Application PCT/US2014/020084 filed on Mar. 4, 2014, the contents of which are incorporated herein by reference in their entirety.

BACKGROUND OF THE INVENTION

Embodiments of the invention generally relate to a control system of a gas turbine engine, and more particularly, to a system for electrical augmentation of a gas turbine engine.

A gas turbine engine typically includes at least one spool having a turbine and a gas generator compressor mounted thereto, a source of heat positioned between the turbine and the compressor, a shaft and a free turbine mounted to the shaft, and a control system for transferring power between the spool and the shaft. For transient loads, gas generator acceleration may be needed to create an increased mass flow for a higher output. A relatively high percentage of total required gas turbine engine surge margin is typically needed to accommodate engine transients, particularly accelerations. This requirement can limit compressor efficiency and therefore overall engine efficiency, because, in general, increased surge margin requires lower compressor loading which results in lower compressor efficiency.

Therefore, a need exists for gas generator augmentation to support increased gas turbine engine compressor efficiency.

SUMMARY OF THE INVENTION

According to one embodiment, an electrical augmentation system for a gas turbine engine is provided. The electrical augmentation system includes an electric motor operably coupled to a shaft of the gas turbine engine, and an energy storage device operable to provide a temporary increased current source to the electric motor. The electrical augmentation system includes a control system having a torque demand anticipation circuit operable to determine an anticipated torque increase condition for the gas turbine engine. Based on the anticipated torque increase condition, the torque demand anticipation circuit commands a temporary torque increase by the electric motor using the energy storage device. The torque demand anticipation circuit may be implemented in an engine control or a higher level system based control, such as a flight control.

In addition to one or more of the features described above, or as an alternative, further embodiments could include an electrical generator driven by the gas turbine engine and operable to provide an electrical current to negate motor inertia of the electric motor. The energy storage device can also be charged by the electrical generator. The energy storage device may be a battery or a super capacitor, for example. The electrical generator and the electric motor may have separate controllers.

In addition to one or more of the features described above, or as an alternative, in further embodiments the electric motor can be a starter motor for the gas turbine engine and may remain configured only as a motor during operation of the gas turbine engine. In one embodiment, where the electric motor is a starter motor, it is not reconfigurable as a generator, for example.

In addition to one or more of the features described above, or as an alternative, in further embodiments the torque demand anticipation circuit may be operable to: monitor a plurality of system state values defining operating conditions of the gas turbine engine over a period of time, identify a trend of the system state values approaching a transient condition associated with a need to accelerate the gas turbine engine, and determine that the anticipated torque increase condition has been reached based on the trend reaching the transient condition associated with the need to accelerate the gas turbine engine. The system state values can be derived from at least one operator input and at least one sensor. An operator input may be a pilot input, such as a collective position control on a rotorcraft. The at least one sensor can include one or more system-level sensors, such as an airspeed/gyroscopic sensor, and/or one or more engine-level sensors, such as an engine speed sensor.

In addition to one or more of the features described above, or as an alternative, in further embodiments the torque demand anticipation circuit may: receive input from an automated control that defines a planned sequence of operating conditions over a period of time, identify within the planned sequence a transient condition associated with a need to accelerate the gas turbine engine, and schedule the anticipated torque increase condition based on an expected time of reaching the transient condition associated with the need to accelerate the gas turbine engine. When embodied in an aircraft, the automated control can be an autopilot.

According to another embodiment, a method of electrical augmentation for a gas turbine engine is provided. A plurality of system state values defining operating conditions of a gas turbine engine over a period of time is monitored. It is determined whether an anticipated torque increase condition for the gas turbine engine has been reached. Based on reaching the anticipated torque increase condition, an electric motor is commanded to provide a temporary torque increase to the gas turbine engine using an energy storage device to provide a temporary increased current source to the electric motor.

In addition to one or more of the features described above, or as an alternative, further embodiments could include regulating an electrical current from an electrical generator driven by the gas turbine engine to negate motor inertia of the electric motor. The energy storage device can be charged by the electrical generator.

In addition to one or more of the features described above, or as an alternative, further embodiments could include identifying a trend of the system state values approaching a transient condition associated with a need to accelerate the gas turbine engine, and determining that the anticipated torque increase condition has been reached based on the trend reaching the transient condition associated with the need to accelerate the gas turbine engine. The system state values may be derived from at least one operator input and at least one sensor.

In addition to one or more of the features described above, or as an alternative, further embodiments could include: receiving input from an automated control that defines a planned sequence of operating conditions over a period of time, identifying within the planned sequence a transient condition associated with a need to accelerate the gas turbine engine, and scheduling the anticipated torque increase condition based on an expected time of reaching the transient condition associated with the need to accelerate the gas turbine engine.

According to another embodiment, a gas turbine engine includes a first shaft upon which a gas generator turbine and a gas generator compressor are mounted. The first shaft is operably coupled to an electric motor of an electrical augmentation system. A heat source is disposed between the gas generator turbine and the gas generator compressor. A power turbine is coupled to a second shaft to drive a load and an electrical generator of the electrical augmentation system, where the second shaft is arranged coaxially with respect to the first shaft. The electrical augmentation system further includes an energy storage device operable to be charged by the electrical generator and to provide a temporary increased current source to the electric motor. The electrical augmentation system also includes a control system with a torque demand anticipation circuit operable to determine an anticipated torque increase condition for the gas turbine engine and, based on the anticipated torque increase condition, the torque demand anticipation circuit commands a temporary torque increase by the electric motor using the energy storage device.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments provide electrical augmentation of a gas turbine engine to accommodate transient loads. An electric motor, such as a starter motor, rapidly increases torque based on an anticipated torque demand. The gas turbine engine and the electric motor have substantially complimentary torque responses, where the gas turbine engine is not initially responsive to torque demand, whereas the electric motor can provide a substantial level of torque upon applying electrical power. An electrical generator deriving rotational power from the gas turbine engine can provide an electrical current to negate motor inertia of the electric motor. An energy storage device can provide a temporary increased current source to the electric motor when an increased torque demand is anticipated.

Figure 1:
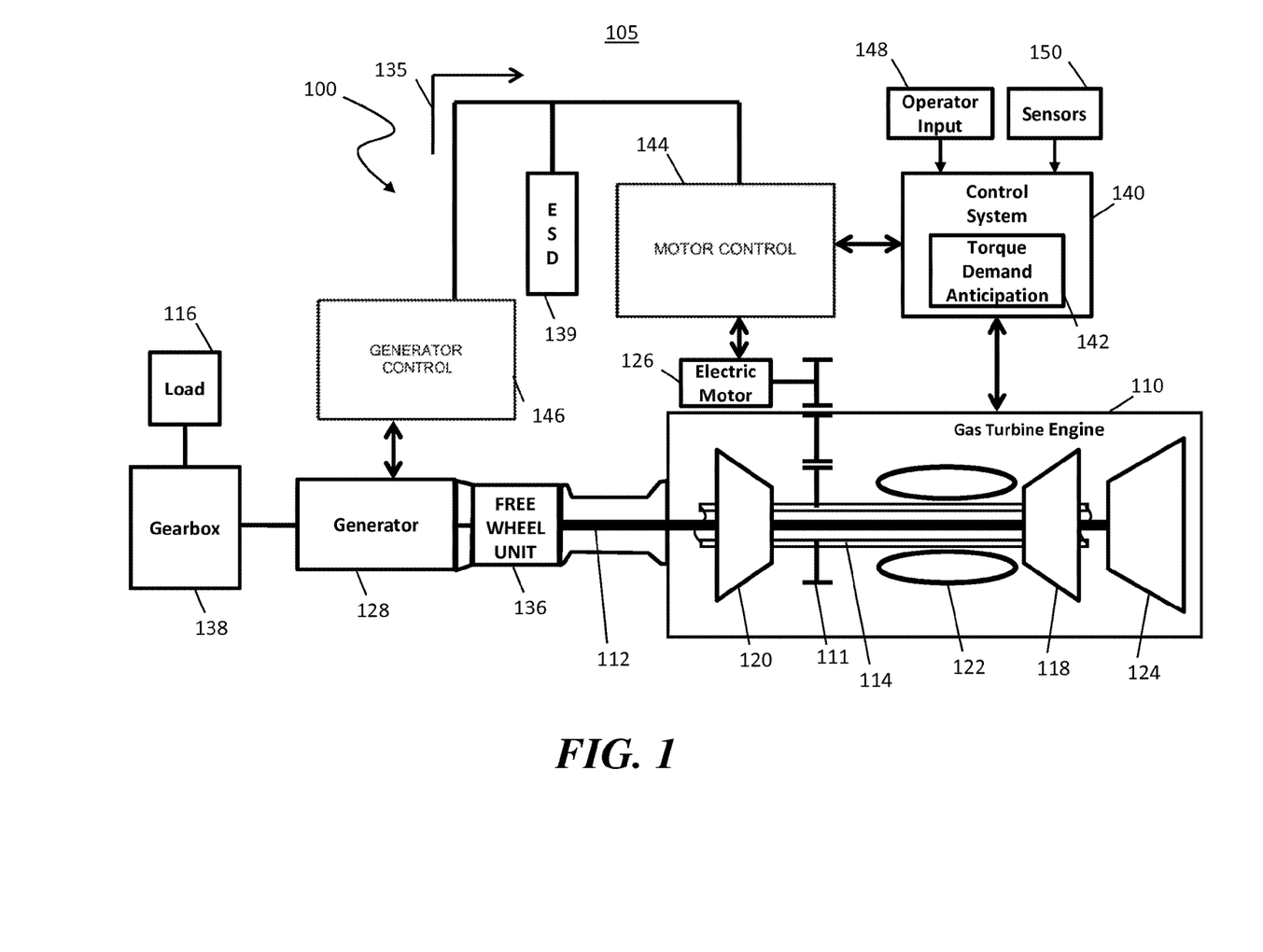
FIG. 1 is a schematic diagram of an exemplary electrical augmentation system for a gas turbine engine in accordance with embodiments.

FIG. 1 is a schematic diagram of an exemplary electrical augmentation system 100 for a gas turbine engine 110 in accordance with embodiments. The electrical augmentation system 100 and the gas turbine engine 110 may be components of a system 105, such as an aircraft, e.g., a rotorcraft.

The gas turbine engine 110 can be mobile or mounted for stationary operation. For instance, the system 105 can be a vehicle operable on ground, water, or in the air. Examples can include a car, bus, train, truck, tank, boat, aircraft, etc. In a stationary configuration, the system 105 can be a power plant. While the example system 105 only depicts a single instance of the gas turbine engine 110, it will be understood that the system 105 can include multiple instances of the gas turbine engine 110 which may be configured for electrical augmentation.

The gas turbine engine 110 can include a shaft 114 that is a spool upon which a gas generator turbine 118 and a gas generator compressor 120 are mounted. A heat source 122, such as a combustor, is disposed between the gas generator turbine 118 and the gas generator compressor 120. The heat source 122 is operable to heat compressed gas exiting the gas generator compressor 120 to increase energy in the compressed gas prior to entering the gas generator turbine 118. The gas generator turbine 118 in turn drives the shaft 114 to rotate.

A power turbine 124 is coupled to a shaft 112 that is used to drive a load 116. The power turbine 124 may also be referred to as a free turbine, as it does not drive the gas generator compressor 120. The shaft 114 may also be referred to as a first shaft 114, and the shaft 112 may be referred to as a second shaft 112. The second shaft 112 may be arranged coaxially within the first shaft 114, such that the second shaft 112 rotates within the first shaft 114. The power turbine 124 extracts energy from gas flowing through it to drive rotation of the shaft 112. Power of the gas turbine engine 110 is defined by the rate of energy extracted by the turbines 118 and 124, where the power is imparted in the respective shafts 114 and 112 as torque. The torque multiplied by rotational speed is substantially equal to the power. The shaft 114 may operate at a higher rotational speed than the shaft 112. Rotational energy of the shaft 112 may pass through a free wheel unit 136, such as an overrunning clutch, and a gearbox 138 before reaching the load 116. The electrical augmentation system 100 may include a generator 128 that also uses the rotational energy of the shaft 112 to produce an electric current 135. While not required, the load 116 can be anything driven by the engine 110 via the gearbox 138. By way of example, in the context of a rotary aircraft, the load 116 could be a main and/or tail rotor system. In the context of power generation, the load 116 could be an electrical generator in other aspects.

In the example of FIG. 1, the electrical augmentation system 100 includes an electric motor 126 operably coupled to the shaft 114 of the gas turbine engine 110. A gear set 111 can be used to couple the electric motor 126 to the shaft 114. The gear set 111 may be selectively engaged or constantly engaged in embodiments, for instance, depending on whether a clutch (not depicted) is used between the electric motor 126 and the shaft 114. The electrical augmentation system 100 also includes an energy storage device 139 operable to provide a temporary increased current source to the electric motor 126. A control system 140 of the electrical augmentation system 100 includes a torque demand anticipation circuit 142 operable to determine an anticipated torque increase condition for the gas turbine engine 110. Based on the anticipated torque increase condition, the torque demand anticipation circuit 142 commands a temporary torque increase by the electric motor 126 using the energy storage device 139. The energy storage device 139 can be a battery or a super capacitor, for example.

The control system 140 can interface with a separate motor control 144 that draws current from the energy storage device 139 for the electric motor 126 based on a command from the torque demand anticipation circuit 142. The electric motor 126 may be a starter motor used to start the engine 110, but could be a motor 126 used in addition to the starter motor in other aspects. The motor control 144 can apply a different level and duration of current to the electric motor 126 when it is being used as a starter and when it is being used to provide a temporary torque increase for the gas turbine engine 110. In an embodiment where the electric motor 126 is only configurable as a motor and not reconfigurable as a generator, and the electric motor 126 remains engaged with the shaft 114, a generator control 146 can regulate the electric current 135 produced by the generator 128 to negate motor inertia of the electric motor 126. For instance, during normal operation where the electric motor 126 is operably coupled to the shaft 114, the generator control 146 can provide the electric current 135 to the motor control 144, which in turn provides the electric current 135 to the electric motor 126 to reduce loading effects on the shaft 114. The energy storage device 139 may also be charged by the electrical generator 128 as controlled, for instance, by the generator control 146.

In an exemplary embodiment, the torque demand anticipation circuit 142 is operable to monitor a plurality of system state values defining operating conditions of the gas turbine engine 110 over a period of time. The system state values may be derived from at least one operator input 148 and at least one sensor 150. The at least one operator input 148 can be a pilot input, such as a collective position control on a rotorcraft, but can also be a computer input as in the case of autonomous or semi-autonomous flight control systems. The at least one sensor 150 include one or more system-level sensors, such as an airspeed/gyroscopic sensor, and/or one or more engine-level sensors, such as an engine speed sensor.

The torque demand anticipation circuit 142 may identify a trend of the system state values approaching a transient condition associated with a need to accelerate the gas turbine engine 110. The torque demand anticipation circuit 142 may also determine that the anticipated torque increase condition has been reached based on the trend reaching the transient condition associated with the need to accelerate the gas turbine engine 110. This is further described in reference to FIG. 2.

Figure 2:
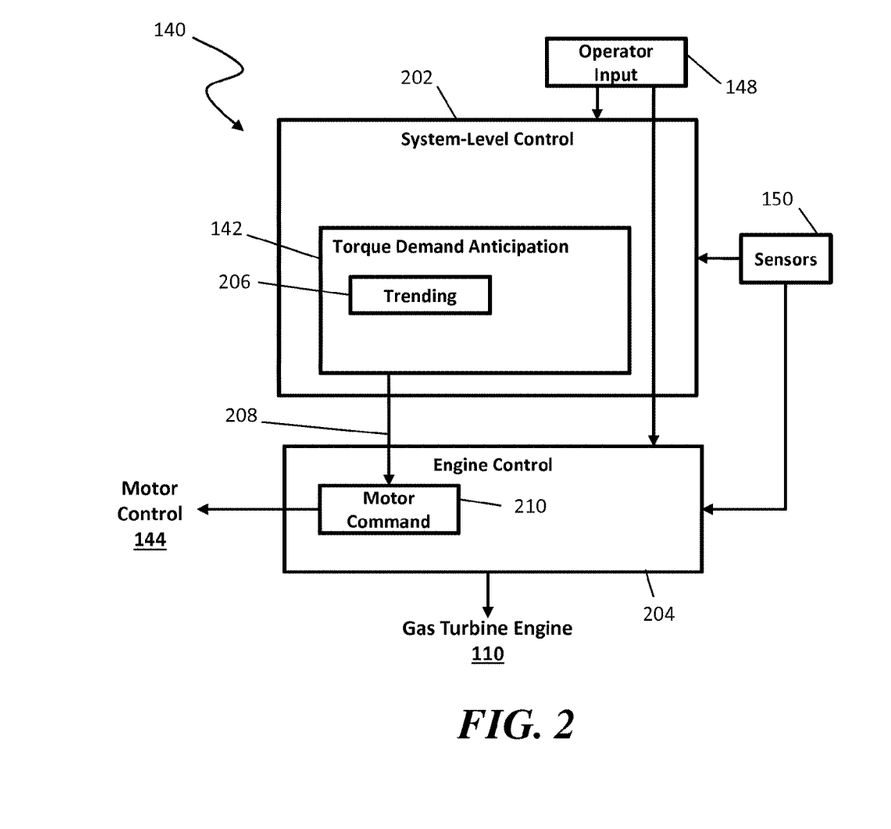
FIG. 2 is a schematic diagram of a control system according to an embodiment.

FIG. 2 is a schematic diagram of an example of the control system 140 of FIG. 1 according to an embodiment. As depicted in FIG. 2, the control system 140 may be further partitioned into a system-level control 202 and an engine control 204. Where the system 105 of FIG. 1 is an aircraft, the system-level control 202 can be a flight control (i.e., a flight management computer). The system-level control 202 and the engine control 204 can both include processing elements known in the art such as one or more processing circuits, memory, input/output interfaces, and support circuitry. Instructions for implementing various features as described herein can be tangibly embodied in a non-transitory computer readable storage medium and/or encoded in hardware circuits in the system-level control 202 and the engine control 204.

The operator input 148 can be provided to both the system-level control 202 and the engine control 204 to make control decisions. For example, in a rotorcraft environment the system-level control 202 can make control decisions for various flight surfaces (not depicted), and the engine control 204 can make decisions to adjust an engine speed or other parameter of the gas turbine engine 110. Input from the sensors 150 can be provided to either or both of the system-level control 202 and the engine control 204. For instance, system-level sensors can be input to the system-level control 202, while engine-level sensors can be input to the engine control 204. For reduced latency, select instances of system-level sensors can be input to the engine control 204, and select instances of engine-level sensors can be input to the system-level control 202.

In the example of FIG. 2, the system-level control 202 includes the torque demand anticipation circuit 142, which may include trending logic 206. The system-level control 202 can convert the operator input 148 and/or data from the sensors 150 into system state values. In an aircraft embodiment, the system state values can include an airspeed vector, an altitude, temperatures, pressures, and the like. In a rotorcraft embodiment, a number of the system state values can be determined at least once per main rotor (not depicted) revolution. The trending logic 206 can monitor for one or more trends in the system state values to determine whether the system 105 of FIG. 1 is approaching a transient condition associated with a need to accelerate the gas turbine engine 110. For instance, a rapidly commanded change in operating conditions or approaching an operating limit, e.g., near a stall or surge limit of the gas turbine engine 110, can be transient conditions associated with a need to accelerate the gas turbine engine 110. When the trending logic 206 determines that the anticipated torque increase condition has been reached based on a trend reaching a transient condition associated with the need to accelerate the gas turbine engine 110, the torque demand anticipation circuit 142 can send a temporary torque increase command 208 to motor command logic 210 of the engine control 204.

The motor command logic 210 can distinguish between engine start conditions and temporary torque increase conditions. For instance, the engine control 204 may receive a start command as an operator input 148 and confirm that conditions of the gas turbine engine 110 (e.g., engine speed) are in range to request the motor control 144 to actuate the electric motor 126 of FIG. 1 to start the gas turbine engine 110. Alternatively, engine parameters can be provided to the system-level control 202 or the motor control 144, and the motor command logic 210 can reside in the system-level control 202 or the motor control 144 accordingly. When the motor command logic 210 receives the temporary torque increase command 208, this serves as an indication that temporary torque increase conditions exist, and the motor control 144 is commanded to temporarily increase torque of the electric motor 126 of FIG. 1 using the energy storage device 139 of FIG. 1 as a temporary increased current source. The motor command logic 210 may also cross compare that the temporary torque increase conditions exist based on engine parameters and/or calculated system state values, e.g., stall/surge margins versus current operating point.

Figure 3:
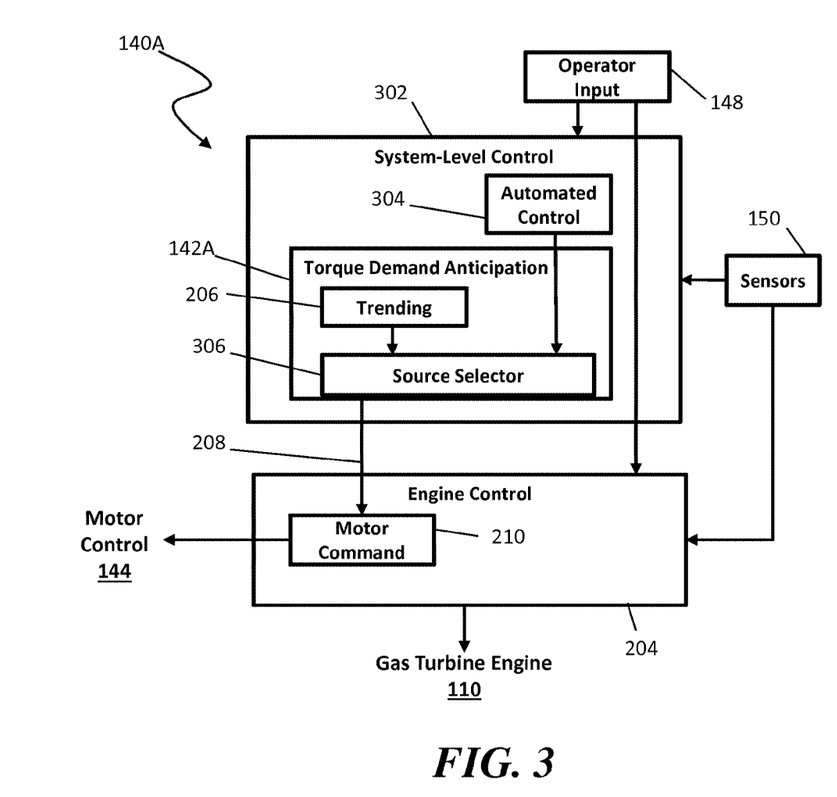
FIG. 3 is a schematic diagram of a control system according to another embodiment.

FIG. 3 is a schematic diagram of a control system 140A according to another embodiment. The control system 140A represents an alternate embodiment of the control system 140 of FIG. 2. The control system 140A of FIG. 3 includes a system-level control 302 and the engine control 204 of FIG. 2. Similar to the system-level control 202 of FIG. 2, the system-level control 302 of FIG. 3 includes a torque demand anticipation circuit 142A with the trending logic 206 of FIG. 2. The system-level control 302 can convert the operator input 148 and/or data from the sensors 150 into system state values. The system-level control 302 can include processing elements known in the art such as one or more processing circuits, memory, input/output interfaces, and support circuitry. Instructions for implementing various features as described herein can be tangibly embodied in a non-transitory computer readable storage medium and/or encoded in hardware circuits in the system-level control 302.

The system-level control 302 can include or receive an automated control 304, such as an automatic pilot function (i.e., an autopilot). The automated control 304 can define a planned sequence of operating conditions over a period of time for the system 105 of FIG. 1. For instance, in an aircraft embodiment, the automated control 304 can implement a flight plan that includes specific set points and transition points. As one example, the automated control 304 can indicate upcoming changes in operating conditions to provide a greater degree of advanced notice of anticipated torque demand increase, e.g., increase in altitude within a particular time or distance. A source selector 306 can use input from the trending logic 206 and the automated control 304 to determine a source for the temporary torque increase command 208. In one example, when the automated control 304 is enabled, it is used as a preferred data source for determining the temporary torque increase command 208; otherwise, the trending logic 206 can be used for torque demand anticipation.

When the automated control 304 is enabled, it may provide a planned sequence of operating conditions over a period of time to the torque demand anticipation circuit 142A. The torque demand anticipation circuit 142A can identify within the planned sequence a transient condition associated with a need to accelerate the gas turbine engine 110. The torque demand anticipation circuit 142A may schedule the anticipated torque increase condition based on an expected time of reaching the transient condition associated with the need to accelerate the gas turbine engine 110. Scheduling can account for various component and system latencies such that the temporary torque increase command 208 is provided to the motor command logic 210 at an appropriate time that correctly anticipates when torque from the electric motor 126 of FIG. 1 is to be delivered to the gas turbine engine 110.

Figure 4:
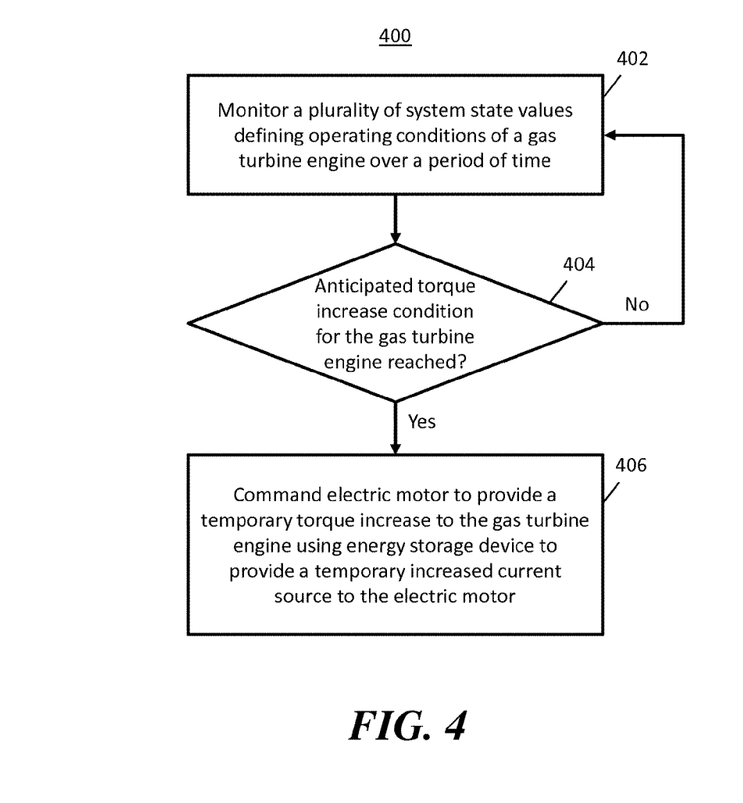
FIG. 4 is a process flow diagram for electrical augmentation of a gas turbine engine according to an embodiment.

FIG. 4 is a process flow diagram of a method for electrical augmentation of a gas turbine engine according to an embodiment. Process 400 as depicted in FIG. 4 can include additional elements beyond those depicted in FIG. 4 and may be applicable to elements as described in reference to FIGS. 1-3. For purposes of explanation, the process 400 is described in reference to the system 105 of FIG. 1.

At block 402, the control system 140 monitors a plurality of system state values defining operating conditions of a gas turbine engine 110 over a period of time. As previously described, the system state values may be derived from at least one operator input 148 and at least one sensor 150.

At block 404, the torque demand anticipation circuit 142 determines whether an anticipated torque increase condition for the gas turbine engine 110 has been reached. The determination may be performed, for example, by using the trending logic 206 of FIGS. 2 and 3 or the automated control 304 of FIG. 3.

At block 406, based on reaching the anticipated torque increase condition, the control system 140 commands the electric motor 126, via the motor control 144, to provide a temporary torque increase to the gas turbine engine 110 using the energy storage device 139 to provide a temporary increased current source to the electric motor 126. Torque from the electric motor 126 can be added to the shaft 114 by the gear set 111. If at block 404, an anticipated torque increase condition for the gas turbine engine 110 has not been reached, the process 400 returns to block 402.

Technical effects include providing additional torque to assist in accelerating a gas turbine engine using electrical augmentation. Using a starter motor as an electric motor to provide electrical augmentation while inhibiting reconfiguration of the electric motor as a generator can simplify design considerations. A dedicated electrical generator can extract power from an output of the gas turbine engine to charge an energy storage device for electrical augmentation and provide an electrical current to negate motor inertia of the electric motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electrical augmentation system for a gas turbine engine, the electrical augmentation system comprising:
    an electric motor operably coupled to a shaft of the gas turbine engine;
    a current source operable to provide current to the electric motor during normal operation of the gas turbine engine;
    an energy storage device operable to provide a temporary increased current to the electric motor; and
    a control system comprising a torque demand anticipation circuit operable to determine that an anticipated torque increase condition for the gas turbine engine has been reached and, in response to determining that the anticipated torque increase condition has been reached, commanding a temporary torque increase by the electric motor using current from the energy storage device.

2. The electrical augmentation system according to claim 1, wherein the current source is an electrical generator driven by the gas turbine engine and operable to provide an electrical current to the electric motor to negate motor inertia of the electric motor.

3. The electrical augmentation system according to claim 2, wherein the energy storage device is charged by the electrical generator.

4. The electrical augmentation system according to claim 1, wherein the electric motor is a starter motor for the gas turbine engine and is not configurable as a generator during operation of the gas turbine engine.

5. The electrical augmentation system according to claim 1, wherein the torque demand anticipation circuit is further operable to:
    receive input from an automated control that defines a planned sequence of operating conditions over a period of time;
    identify within the planned sequence a transient condition associated with a need to accelerate the gas turbine engine; and
    schedule the anticipated torque increase condition based on an expected time of reaching the transient condition associated with the need to accelerate the gas turbine engine.

6. The electrical augmentation system according to claim 1, wherein the energy storage device is a battery or a super capacitor.

7. A method of electrical augmentation for a gas turbine engine, the method comprising:
   providing current to an electric motor from a current source during normal operation of the gas turbine engine;
   monitoring a plurality of system state values defining operating conditions of the gas turbine engine over a period of time;
   determining whether an anticipated torque increase condition for the gas turbine engine has been reached; and
   based on reaching the anticipated torque increase condition, commanding an electric motor to provide a temporary torque increase to the gas turbine engine using an energy storage device to provide a temporary increased current to the electric motor.

8. The method according to claim 7, wherein the current source is an electrical generator driven by the gas turbine engine and providing current to an electric motor from a current source during normal operation includes regulating the current provided from the electrical generator to the electric motor to negate motor inertia of the electric motor.

9. The method according to claim 8, further comprising: charging the energy storage device by the electrical generator.

10. The method according to claim 7, wherein the electric motor is a starter motor for the gas turbine engine and is not configurable as a generator during operation of the gas turbine engine.

11. The method according to claim 7, further comprising:
   receiving input from an automated control that defines a planned sequence of operating conditions over a period of time;
   identifying within the planned sequence a transient condition associated with a need to accelerate the gas turbine engine; and
   scheduling the anticipated torque increase condition based on an expected time of reaching the transient condition associated with the need to accelerate the gas turbine engine.

12. A gas turbine engine comprising:
   a first shaft upon which a gas generator turbine and a gas generator compressor are mounted, the first shaft operably coupled to an electric motor of an electrical augmentation system;
   a heat source disposed between the gas generator turbine and the gas generator compressor; and
   a power turbine coupled to a second shaft to drive a load and an electrical generator of the electrical augmentation system, the electrical generator being operable to provide current to the electric motor during normal operation of the gas turbine engine, the second shaft arranged coaxially with respect to the first shaft;
   wherein the electrical augmentation system further comprises:
      an energy storage device operable to be charged by the electrical generator and to provide a temporary increased current to the electric motor; and
      a control system comprising a torque demand anticipation circuit operable to determine an anticipated torque increase condition for the gas turbine engine has been reached and, in response to determining that the anticipated torque increase condition has been reached, commanding a temporary torque increase by the electric motor using current supplied from the energy storage device.

13. The gas turbine engine according to claim 12, wherein the electrical generator is operable to provide an electrical current to negate motor inertia of the electric motor.

14. The gas turbine engine according to claim 12, wherein the electric motor is a starter motor for the gas turbine engine and is not configurable as a generator during operation of the gas turbine engine.

15. The gas turbine engine according to claim 12, wherein the torque demand anticipation circuit is further operable to:
   receive input from an automated control that defines a planned sequence of operating conditions over a period of time;
   identify within the planned sequence a transient condition associated with a need to accelerate the gas turbine engine; and
   schedule the anticipated torque increase condition based on an expected time of reaching the transient condition associated with the need to accelerate the gas turbine engine.

* * * * *